United States Patent
van Essen et al.

(10) Patent No.: US 8,832,486 B2
(45) Date of Patent: Sep. 9, 2014

(54) METHOD AND SYSTEM FOR PREDICTING THE POWER CONSUMPTION OF A MOBILE TERMINAL

(75) Inventors: Dirk van Essen, Steenwijk (NL); Marco van de Logt, Zwolle (NL); Gjalt Loots, Groningen (NL); Albert Renzo Westers, Noordwijk (NL)

(73) Assignee: Nederlandse Organisatie voor toegepast-natuurwetenschappelijk Onderzoek TNO, Delft (NL)

( * ) Notice: Subject to any disclaimer, the term of this patent is extended or adjusted under 35 U.S.C. 154(b) by 1265 days.

(21) Appl. No.: 12/666,616

(22) PCT Filed: Jun. 25, 2008
(Under 37 CFR 1.47)

(86) PCT No.: PCT/NL2008/050420
§ 371 (c)(1),
(2), (4) Date: May 8, 2013

(87) PCT Pub. No.: WO2009/002171
PCT Pub. Date: Dec. 31, 2008

(65) Prior Publication Data
US 2013/0246827 A1 Sep. 19, 2013

(30) Foreign Application Priority Data
Jun. 25, 2007 (EP) ..................................... 07110946

(51) Int. Cl.
*G06F 1/00* (2006.01)
*G06F 11/30* (2006.01)

(52) U.S. Cl.
USPC ................ 713/340; 713/300; 702/57; 702/61

(58) Field of Classification Search
CPC ............ G06F 11/3062; G01R 31/3606; G01R 31/3624
USPC ............................... 713/300, 340; 702/57, 61
See application file for complete search history.

(56) References Cited

U.S. PATENT DOCUMENTS 6,957,091 B1 10/2005 Ptasinski et al.
8,307,224 B2 * 11/2012 Conroy et al. ................ 713/300
(Continued)

FOREIGN PATENT DOCUMENTS

FR 2 857 100 1/2005

OTHER PUBLICATIONS

Brandolese et al., "Static Power—Modeling of 32-Bit Microprocessors" IEEE Transactions on Computer Aided Design of Integrated Circuits and Systems, IEEE Service Center, vol. 21, No. 11, Nov. 2002, pp. 1306-1316.
Brandolese et al. "A multi-level strategy for Software power estimation" System Synthesis, 2000. Proceedings. The 13th International Symposium, IEEE, Sep. 20, 2000, pp. 187-192.

(Continued)

*Primary Examiner* — Jaweed A Abbaszadeh
(74) *Attorney, Agent, or Firm* — Leydig, Voit & Mayer, Ltd.

(57) ABSTRACT

A method of and device for predicting the power consumption of a battery-powered mobile terminal (15) used for carrying out a sequence of user activities. Each user activity involves an interaction with the terminal and each user activity causes one or more terminal activities involving power consumption of the terminal. The method comprises the steps of: —determining (4), for each user activity, which terminal activities it causes, —carrying out (6) a series of user activities (2a, ..., 2m), the terminal activities (Ia...In) of the series involving at least all terminal activities of the sequence, —measuring (6) the power consumption of the terminal while carrying out the series of user activities, —deriving (10) the power consumption of each terminal activity from the measured power consumption of the terminal, —adding (12), for each of the user activities of the sequence, the stored power consumption of the respective terminal activities caused by the particular user activity to obtain the power consumption of the respective user activity, and —adding (14) the respective power consumption of the user activities of the sequence to obtain the power consumption of the sequence.

12 Claims, 3 Drawing Sheets

(56) References Cited

U.S. PATENT DOCUMENTS

| | | | |
|---|---|---|---|
| 8,332,679 B2* | 12/2012 | Conroy et al. | 713/340 |
| 8,453,086 B2* | 5/2013 | Tung et al. | 716/109 |
| 2004/0098222 A1 | 5/2004 | Pehrsson et al. | |
| 2013/0103968 A1* | 4/2013 | Conroy et al. | 713/340 |

OTHER PUBLICATIONS

International Search Report dated Aug. 11, 2008 for PCT/NL2008/050420.

* cited by examiner

METHOD AND SYSTEM FOR PREDICTING THE POWER CONSUMPTION OF A MOBILE TERMINAL

FIELD OF THE INVENTION

The invention relates to a system for the prediction of the power consumption of a mobile terminal, in particular a battery-powered mobile terminal. The invention also relates to a method for the prediction of the power consumption of a mobile terminal.

BACKGROUND OF THE INVENTION

The battery life (that is, the time span during which a battery can be used before the battery charge is depleted) of a battery-powered mobile terminal is a very important factor in the user experience of such a terminal. A shorter than expected battery life can be very unsatisfactory and can harm the user's satisfaction, in spite of any appealing features of the terminal such as colour screen, camera and browsing services. Examples of battery-powered mobile terminals are a mobile phone, a barcode scanner, a remote control unit and a personal digital assistant (PDA).

The battery life of a battery-powered terminal is dependent on the way a user uses the battery-powered terminal (which user activities are carried out, for how long). A different (battery-powered) terminal usage will cause different time durations before a terminal shuts down due to low battery. As a consequence battery-powered terminals will differ in their relative battery performance for typical groups of users. In order to relate power off time to a typical group of users, usage profiles can be used.

In order for a battery-powered operator/terminal vendor to provide the end user with a terminal that has a satisfactory battery life, exhaustive measuring and testing of the battery-powered terminal is necessary. This includes the 'classic' (standardized) testing of talk-time and standby-time (these values are often used by terminal vendors/operators when selling their battery-powered terminals). During such tests the terminal is used according to a usage profile until the battery charge is depleted, whereby the usage profile comprises a plurality of user activities, like performing a voice call, to be performed by a user.

Nowadays these tests are not satisfactory because of the extended functionality of battery-powered terminals. Users can perform a large number of other user activities on their battery-powered terminal, such as browsing, running java applications, camera use, etc. It is a problem that there is no standardized method of measuring the power consumption of these activities. This makes it difficult to benchmark the battery life of battery-powered terminals, in particular to benchmark per usage profile, where each usage profile comprises a number of user activities.

The Prior Art fails to provide a satisfactory solution. U.S. Pat. No. 6,957,091 discloses a portable multi-band communication device containing a power amplifier, a battery and a controller which controls the output power level of the communication device. The controller monitors the digital output signal and in response determines the consumption of electrical energy from the battery. A control value of the output power amplifier is used for power consumption estimation. Clearly, U.S. Pat. No. 6,957,091 fails to take the power consumption effects of various distinct user activities into account.

United States Patent Application US 2004/098222 discloses a method of determining usage time for a plurality of modes of a mobile device. Storage locations are provided for storing current usage values, each storage location being associated with a particular mode of the terminal. Thus various modes may be taken into account, but the individual power consumption of different user activities, and the causes of those differences, are not addressed, thus necessarily causing inaccurate estimates when the power consumption due to various user activities has to be predicted.

SUMMARY OF THE INVENTION

It is an object of the invention to provide a method and device for predicting the power consumption of a battery-powered terminal related to user activities, using a non-exhaustive test.

This object is achieved according to the present invention by a method of predicting the power consumption of a battery-powered mobile terminal used for carrying out a sequence of user activities, wherein each user activity involves an interaction with the terminal and wherein each user activity causes one or more terminal activities involving power consumption of the terminal, the method comprising the steps of:
  determining, for each user activity, which terminal activities it causes,
  carrying out a series of user activities, the terminal activities of the series involving at least all terminal activities of the sequence,
  measuring the power consumption of the terminal while carrying out the series of user activities,
  deriving the power consumption of each terminal activity from the measured power consumption of the terminal,
  adding, for each of the user activities of the sequence, the power consumption of the respective terminal activities caused by the particular user activity to obtain the power consumption of the respective user activity, and
  adding the respective power consumption of the user activities of the sequence to obtain the power consumption of the sequence.

By determining the terminal activities that the terminal performs during a certain user activity, it is possible to predict very accurately the power consumed during the user activity. Determining which terminal activities are associated with a certain user activity may be carried out by observation and subsequent (manual or computerised) recording, but are preferably carried out electronically, for instance by analysing signals produced in the terminal.

The series of user activities may be identical to the sequence of user activities. However, the present invention offers the further advantage that the series may not identical to the sequence. That is, the sequence of user activities of which the power consumption is to be predicted does not have to be tested as such, as long as the power consumption of all terminal activities associated with (the user activities of) the sequence is known. The present invention therefore offers a very accurate method of predicting the power consumption of a sequence of user activities without having to test the sequence itself. When carrying out the series of user activities, the terminal activities of the series should normally involve at least all terminal activities of the sequence. Alternatively, the various user activities and/or terminal activities may be carried out at different points in time, while storing the results, thus making it unnecessary to carry out (part or all of) a series of user activities when the power consumption of a new sequence of user activities is to be predicted.

The step of deriving the power consumption of each terminal activity may comprise the sub-step of storing the power consumption of each terminal activity. Similarly, the step of determining, for each user activity, which terminal activities it causes may involve storing its results. It will be understood that in all steps of the inventive method, intermediary and/or final results may be stored when necessary.

In an advantageous embodiment, the series of user activities may be defined by a test template, such as a test profile, which may correspond to a usage profile. Accordingly, a usage profile may be tested using the method of the present invention.

The step of measuring the power consumption of the terminal may comprise measuring the current consumption of the terminal, preferably also measuring a power source voltage from a power source connected to the terminal.

In an embodiment of the present invention, calculating at least one terminal activity power consumption measure from at least one user activity power consumption measure comprises solving a set of linear equations with user activity power consumption measures and terminal activity consumption measures. By simple linear algebra the terminal activity power consumption can be established.

A further embodiment of the present invention, wherein measuring the power consumption of the mobile terminal comprises measuring the current consumption of the mobile terminal, provides a simplification of the method in that no power source voltage has to be taken into account while establishing the power consumption.

A still further embodiment of the present invention, wherein the measuring the power consumption of the mobile terminal further comprises measuring a power source voltage from a power source connected to the terminal, has the advantage that the power consumption of the terminal can be established more accurately, since, when the power source voltage drops, the current consumption increases. Various batteries used as power source may have different characteristics regarding the voltage behaviour while being depleted. Using the power consumption based upon power source voltage and current provides a better measure for comparison between various types of power sources, i.e. batteries.

A yet further embodiment of the present invention additionally comprises the step of displaying the terminal power consumption measure on a display. This embodiment has the advantage that the result can be made available in a user friendly way.

The present invention additionally provides a software program product for carrying out at least some of the method steps of the present invention. The software program product may comprise a plurality of instructions allowing a processor to carry out method steps. The software program product may, for example, be stored on a carrier, such as a CD or DVD, or on a (remote) server.

The present invention also provides a system for the prediction of the power consumption of a battery-powered mobile terminal used for carrying out a sequence of user activities, wherein each user activity involves an interaction with the terminal and wherein each user activity causes one or more terminal activities involving power consumption of the terminal, the system comprising:
 a power source,
 terminal connection means for connecting the power source to the terminal, the terminal connection means comprising a current measuring device,
 a data acquisition interface connected to the current measuring device for inputting a terminal current measure,
 a terminal power consumption evaluation processor connected to the data acquisition interface, wherein the processor is arranged for measuring the power consumption of the mobile terminal during a series of user activities, the terminal activities of the series involving at least all terminal activities of the sequence, and
wherein the processor is further arranged for performing the steps of:
deriving the power consumption of each terminal activity from the measured power consumption of the terminal activity,
adding, for each of the user activities of the sequence, the power consumption of the respective terminal activities caused by the particular user activity to obtain the power consumption of the respective user activity, and
adding the respective power consumption of the user activities of the sequence to obtain the power consumption of the sequence.

An advantageous embodiment, wherein the data acquisition interface has means for inputting a power source voltage, has the advantage that the power consumption of the terminal can be established more accurately, since the current consumption increases when the power source voltage drops. Different batteries used as power source may have different characteristics regarding the voltage behaviour while being depleted. Using the power consumption based upon both power source voltage and current provides a better measure for comparison between various types of power sources, i.e. batteries.

A further embodiment, wherein the system further comprises a display and wherein the processor is arranged for displaying the terminal power consumption measure on the display, has the advantage that the result can be made readily accessible to a user.

Measuring all relevant terminal activities only once will give insight in a wide range of user profiles (that can be adjusted when necessary) and give insight in what area the terminal vendor should improve to achieve better results. Benchmarking can be performed per user activity or terminal activity which gives useful arguments in discussions with terminal vendors. Furthermore it provides useful information for marketeers because the effect of terminals (and terminal improvements) can be mapped on user profiles. This may give insight in the best terminal for each market segment.

DETAILED DESCRIPTION OF PREFERRED EMBODIMENTS

In this description, embodiments of the invention are disclosed in relation with a mobile phone as a mobile terminal. It will be clear to a person skilled in the art that the use of a mobile phone is just an example and that the invention is applicable to, and may be used with, any type of (battery-powered) mobile terminal, such as PDAs (Personal Digital Assistants), laptop and notebook computers, and cameras.

In order to relate mobile terminal usage to battery life, typical usage profiles $3a, \ldots, 3l$ can be formulated. These usage profiles $3a, \ldots, 3l$, which each comprise one or more user activities, are assumed to represent typical mobile terminal usage by a certain type of user. For this reason, the usage profiles are also referred to as user profiles.

Usage of a mobile terminal can be divided into several user activities 2a, ..., 2m. A user activity 2a, ..., 2m is a single activity a user may perform on a mobile terminal during a certain period of time. Examples of user activities can be, browsing, writing a message, performing a voice call, playing a streaming video. Many other user activities can be envisaged by a person skilled in the art. The power consumption of these user activities vary, e.g. a voice call consumes another amount of current (per second) than executing a java application. Because the power consumption determines the battery life, the battery life is heavily affected by the type and duration of the activities the user performs.

Figure 1:
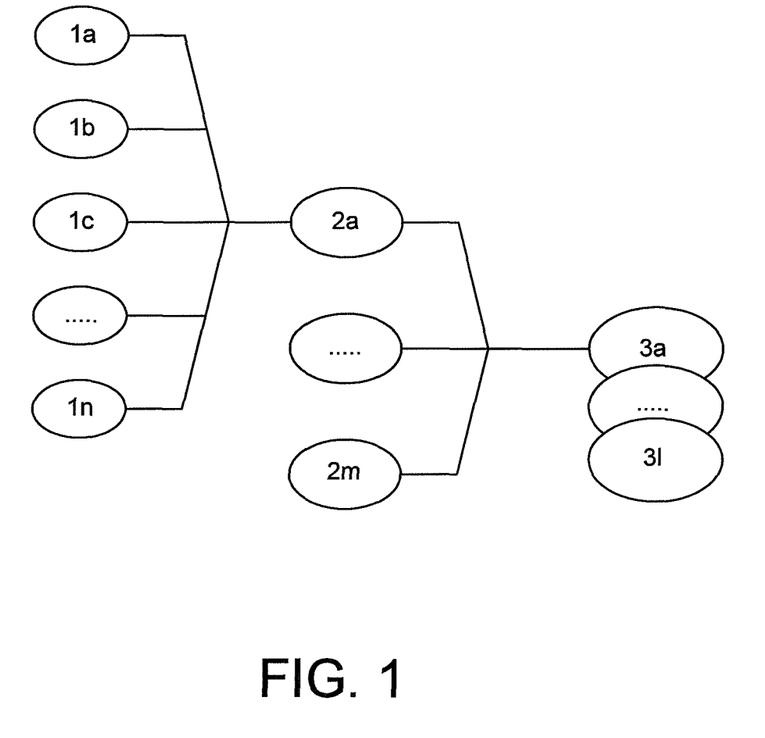
FIG. 1 schematically shows the interdependence of terminal activities, user activities and usage profiles.

Thus, a usage profile describes an array of user activities, preferably including relative user activity duration, typical for a specific user. Relative user activity durations are used, defined as a percentage of the total time a terminal is used. The interdependence of terminal activities, user activities and usage profiles is shown in FIG. 1. A usage profile comprises a plurality of user activities, which in turn comprise at least one terminal activity. A terminal activity therefore is an activity of the terminal caused by a user activity. Accordingly, a number of terminal activities are typically associated with each user activity, although some user activities may only involve a single terminal activity.

Example Usage Profile 1:
- 4% of time: browsing
- 4% of time: executing java application
- 70% of time: stand-by
- 10% of time: voice call
- 2% of time: camera usage
- 10% of time: sending text (SMS and/or MMS) messages A usage profile can be tested according to a known method by actually performing the user activities in a described usage profile. This method is also known as a stress test, because the battery is completely exhausted for every usage profile 3a ... 3l tested. The steps in this known method can be:

1: Describing a series of usage profiles in terms of user activities.
2: Fully charging the battery of mobile terminal.
3: Performing a usage profile according to step 1 repeatedly until power off of the mobile terminal due to an empty battery.
4: Repeating steps 2 and 3 for each usage pattern.

An example of performing steps 1, 2 and 3 is:
15 minutes browsing
10 minutes java application
60 minutes stand-by
15 minutes voice call
60 minutes stand-by
10 minutes camera usage
2 minutes creating MMS
10 seconds sending MMS
60 minutes stand-by
... and repeating until the battery is depleted.

This Prior Art method is a very time-consuming and labour-intensive, and therefore expensive method. Furthermore, this known method cannot identify the most power consuming user activity in a usage profile. No predictions can be made for other usage profiles and no suggestions to terminal vendors can be distilled, while benchmarking is not useful. The better the battery, the longer each measurement step will take. The more usage profiles are defined, the longer the complete measurement will take.

In the method according to the present invention the stress tests are replaced by power consumption measurements per user activity.

A user activity 2a, ..., 2m can be subdivided into at least one predefined terminal activity 1a ... 1n. A terminal activity is a single activity a terminal performs when it is in use. Examples of terminal activities can be: receiving data packets, searching a mobile network, backlighting a display, running a java program. Many other terminal activities can be readily recognised by a person skilled in the art. Each terminal activity 1a ... 1n may have its start and stop moment in time anywhere during the user activity. Terminal activities 1a ... 1n may occur simultaneously or consecutively.

The power consumption of these terminal activities 1a ... 1n has to be determined in order to compare terminals. It is not possible to calculate all terminal activities 1a ... 1n directly, because a user activity 2a, ..., 2m usually comprises a plurality of terminal activities 1a ... 1n, e.g. browsing comprises lighting backlight+sending data+receiving data. The power consumption of terminal activities can be derived from the user activities.

To determine the cause of a bad battery performance of a terminal, the terminal activities 1a ... 1n can be compared with those of other terminals. E.g. very high power consumption during browsing of a first terminal could be caused by the fact that the backlight power consumption is twice as high as the backlight power consumption of a second terminal.

The power consumption measure of a user activity 2a, ..., 2m can be an array of several terminal 1a ... 1n activities power consumption measures, including relative activity duration (expressed as percentages of the total power consumption of that terminal activity). Example: the user activity 'browsing' may comprise the mobile terminal activities 100% 'backlight'+2% 'sending data'+23% 'receiving data'. This assumes that during browsing users are actively sending and receiving data 25% of their time, where reading/watching content is done for 75% of their time. Backlight will be on for 100% of the browsing time.

To summarize, usage profiles 3a ... 3l can be built from user activities 2a ... 2m which in turn can be built from terminal activities 1a ... 1n, as visualized by FIG. 1.

The proposed method according to the invention makes it possible to measure current consumption related to a terminal activity 1a ... 1n. By means of the formulas below the power off time for each profile can be predicted.

$$E_{User\ Activity}(m) = \sum_n \{E_{Terminal\ Activity}(n) * T_{Terminal\ Activity}(n)\}, \quad [1]$$

wherein $E_{User\ Activity}(m)$ is the power consumption in Wh of the $m^{th}$ user activity 2a ... 2m, $E_{Terminal\ Activity}(n)$ the power consumption of the $n^{th}$ terminal activity and $T_{Terminal\ Activity}(n)$ the relative duration of the $n^{th}$ terminal activity with respect to the $m^{th}$ user activity.

$$E_{Usage\ Profile}(l) = \sum_m \{E_{User\ activity}(m) * T_{User\ Activity}(m)\}, \quad [2]$$

wherein $E_{Usage\ Profile}(l)$ is the power consumption in Wh of the $l^{th}$ usage profile 3a ... 3l, $E_{User\ Activity}(m)$ the power consumption of the $m^{th}$ user activity in the usage profile $3a \ldots 3l$ and $T_{User1\ Activity}(m)$ the relative duration of the $m^{th}$ user activity with respect to the usage profile $3a \ldots 3l$.

$$T_{off} = \frac{\text{Battery capacity} * \text{Aging factor}}{E_{Usage\ Profile}}, \quad [3]$$

wherein $T_{off}$ is the power-off time, that is the time a mobile terminal can be used according to a usage profile, and wherein the aging factor is due to battery recharging cycles.

Figure 2:
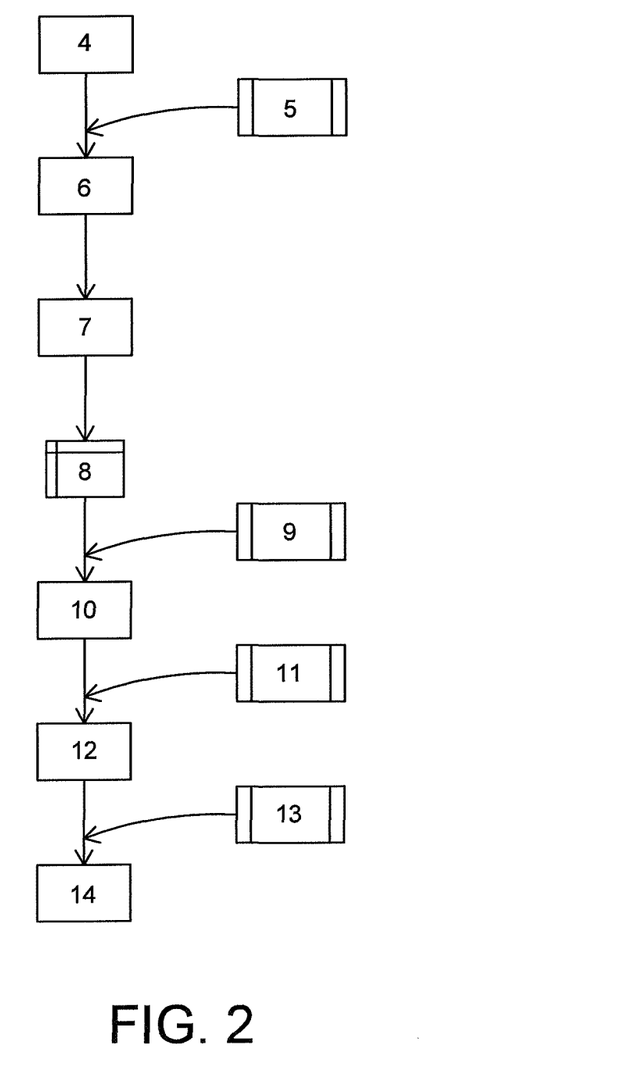
FIG. 2 schematically shows a diagram of an embodiment of a method according to the present invention.

From the measured power consumption per terminal activity $1a \ldots 1n$ also the power consumption of a specific User activity $2a, \ldots, 2m$ during one battery cycle can be determined:

Power consumption User Activity during one battery charge cycle [$Wh$]=Battery life [$h$]*Power consumption User Activity [$Wh$]*Relative duration User Activity An example of applying the method according to an embodiment of the invention is shown in FIG. 2 and described below.

The measurements are preferably automated as far as possible. A test engineer who uses the method according to an embodiment of the invention has to start with supplying information about some characteristics of the measurement and the terminal involved.

Measurement Characteristics:

In each test, the measurement characteristics may differ. In order to be able to look for specific environment influences on the tests, the measurement characteristics and the terminal characteristics should be recorded in step 4 of FIG. 2.

The measurement characteristics can be, for example (see Table 1):

TABLE 1

Test number
Date
Comments before measurement
Comments after measurement
Test engineer
Test location
GSM coverage (RF level)
Power Control Level
IMEI Terminal Characteristics:

For the correct calculation of power consumption and its comparison to the power consumption of other terminals (and reference values) the terminal characteristics should be recorded:

TABLE 2

(terminal characteristics):

Terminal Type
Hardware version
Software version
Battery type (Li-ion, Li-p)
Battery capacity (mAh)
Battery age (new, used, old)
First and second display
Display type (TFT, LCD)
Display size (mm * mm)
Display size (pixels * pixels)
Display power management characteristics (15 sec less bright; 30 sec off)
Keylight (yes/no)

TABLE 2-continued (terminal characteristics):

Keylight characteristics
Terminal with/without flip
Camera
Java

In addition, the relationships between user activities and terminal activities may be recorded in step 4, if they are already known. Alternatively, these relationship may be established during the actual test phase.

Measurements:

After the measurement characteristics and terminal characteristics have been entered in step 4 (FIG. 2), power consumption tests are performed in step 6, preferably on the basis of a test template 5. The test template 5 comprises the user activities to be performed by the test engineer. In step 6 the test engineer performs the user activities as prescribed by the test template 5. The terminal power consumption during the user activities is measured and recorded, and optionally integrated (that is, summed). The terminal power consumption can be established by measuring the terminal current and optionally the voltage of the power source (17 in FIG. 3) during the terminal activities performed by the test engineer. The user activity power consumptions thus established can be stored in step 7 in a data structure 8 matching the test template 5 for performing calculations off line.

TABLE 3

(exemplary measurements):

A. Power consumption voice call, flip open, backlight off,
B. Backlight Power consumption 1, ($2^{nd}$ display off, key light off),
C. Backlight Power consumption 2, ($2^{nd}$ display on, key light off),
D. Backlight Power consumption 3, ($2^{nd}$ display off, key light on),
E. Backlight Power consumption 4, ($2^{nd}$ display on, key light on),
F. Browsing, split by the test engineer into:
    a. Receiving data
    b. Sending data
G. Power consumption in coverage, (no user activities, flip closed),
H. Power consumption non-coverage, (no user activities, flip closed, this measurement has to be performed for a long time to be able to also determine the search pattern, coming from good coverage/starting from non-coverage), split into:
    a. Search activity
    b. Sleep activity
I. Power consumption offline Java application,
J. Power consumption camera search function, (default settings; write down default settings, like: is $2^{nd}$ display on),
K. Power consumption playing video from phone memory
L. Power consumption playing video via streaming Terminal Activities:

The terminal activities power consumptions that must be calculated in step 10 may be:

TABLE 4

(terminal activities 1a ... 1n):

1. Voice call
2. Receiving data
3. Sending data
4. Backlight main display
5. Backlight other display
6. Keylight
7. Run Java application
8. Camera search function
9. Video displaying
10. Sleep in coverage TABLE 4-continued (terminal activities 1a ... 1n):

11. Sleep in non coverage
12. Search activity

As stated above, a user activity $2a, \ldots, 2m$ (like browsing and messaging) comprises one or more terminal activities $1a \ldots 1n$. The power consumptions of these terminal activities $1a \ldots 1n$ have to be determined in order to compare terminals. It is not possible to calculate all terminal activities directly (e.g. because browsing consists of backlight+sending data+receiving data). From the user activity power consumption measurements the terminal activities power consumptions can be calculated in step 10 using a template 9 as described, by way of example, below:

A='1'
B='4'
C='4'+'5'
D='4'+'6'
E='4'+'5'+'6'
Fa='2'+'4'+'5'+'6'
Fb='3'+'4'+'5'+'6'
G='10'
Ha='12'
Hb='11'
I='7'+'4'+'5'+'6'
J='8'+'4'+'5'+'6'
K='9'+'4'+'5'+'6'
L='9'+'2'+'4'+'5'+'6'

The numbers between apostrophes refer to the terminal activity power consumption corresponding with the terminal activities in Table 4.

Hence:
'1'=A
'4'=B
'5'=B+C
'6'=B+D
... etc.

On the basis of the calculated terminal activity power consumptions, user activity power consumption values can be calculated in step 12 according to a user activity calculation template 11. This template 11 may contain the relationships between the user activities and the associated terminal activities. In step 12 user activity power consumption values can be calculated for user activities which may not have been tested, but of which the associated terminal activities are known.

Customer Report:

The results of the automated measurement suite that can be reported in step 14 to a customer can be as listed as in Table 5 (below), for example, wherein each item is a linear combination of user activity power consumptions according to a usage profile $3a \ldots 3l$. A template 13 may be used for compiling the report.

TABLE 5

(report):

Talk time terminal
Standby time
   In coverage
   Non-coverage
Search pattern
   Starting in non-coverage
   Coming from good coverage
Power consumption Voice call TABLE 5-continued (report):

Power consumption Backlight main display
Power consumption Backlight other display
Power consumption Keylight
Power consumption Browsing
Power consumption Stand-by
   In coverage
   Non-coverage
Power consumption Java application
Power consumption Camera usage
Power consumption Video playing from terminal memory
Power consumption Video streaming From these results the impact of several usage profiles $3a \ldots 3l$ on the overall power consumption measure of the terminal can be calculated. These results can further be compared to usage profiles of other terminals.

Figure 3:
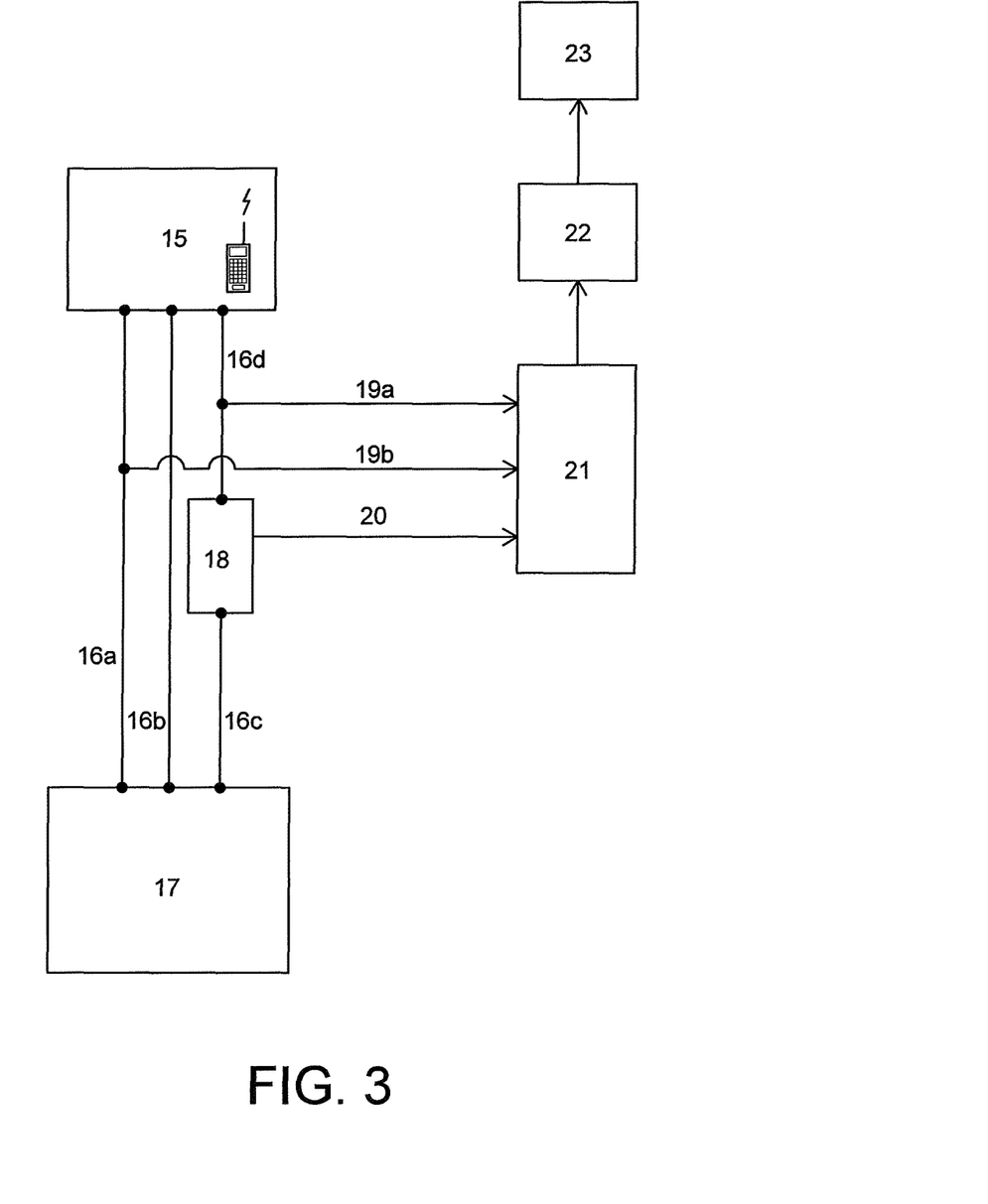
FIG. 3 schematically shows a diagram of an embodiment of a system according to the present invention.

The method according to the invention as described above can be implemented in a system for the prediction of the power consumption of a terminal 15 according to an embodiment of the invention. A block diagram of an embodiment of this system is shown in FIG. 3.

This system for the prediction of the power consumption of a terminal 15 comprises an electrical power source 17. This can be for example a power supply connected to the mains, a battery or a rechargeable battery fit for supplying the terminal with electric energy. Preferably the battery is removed from the terminal, placed in a holder and connected to the terminal using terminal connection means $16a \ldots 16d$. The voltage may vary per terminal 15 and terminal type under test, but usually for a mobile phone the voltage is around 3.6 V. The power source 17 may further comprise a plurality of power sources depending on the terminal under test. A terminal power source 17 may have a plurality of connections as shown in FIG. 3 by example of three connections $16a \ldots 16d$, depending on the terminal 15 under test. According to the invention, the power consumption from the terminals having the largest voltage is established.

The power source 17 has terminal connection means $16a \ldots 16d$. This can be a cable fit for connecting the terminal 15 to the power source 17, using a connector, but the connection means $16a \ldots 16d$ may also comprise a terminal mount or holder in which a terminal 15 may be inserted for connecting to the power source 17.

The terminal connection means $16a \ldots 16d$ comprises a current measuring device 18 for measuring the terminal current 20. The currents to be measured are typically in the range of 5 to 3000 mA where the terminal 15 under test is a mobile phone, but the system is not limited to this range; any current range and even AC current may apply.

The current measuring device 18 may comprise a current to voltage converter, well known to a person skilled in the art. The current measuring device 18 is connected to a data acquisition interface 21 for digitising the terminal current resulting in a momentary terminal current value. The current measuring device 18 can be an AD-converter having a plurality of inputs fit for digitizing a signal. The AD-converter may further be equipped with leads and inputs 19a, 19b for a power source 17 voltage measurement, or if the power source 17 is a battery, the battery voltage. The AD-converter can digitise the power source 17 voltage resulting in a momentary power source voltage value.

The data acquisition interface 21 may be an integral part of or connected to a terminal power consumption evaluation processor 22 for forwarding and processing of the terminal current value and the momentary power source voltage value.

From here on the terminal power consumption evaluation processor 22 is referred to as the processor 22. The processor 22 may be a personal computer, for example a laptop computer or a dedicated, embedded, computer.

A momentary terminal power consumption value can be established by multiplying the momentary power source voltage value with the momentary terminal current value by the processor 22. Alternatively, if the power source 17 voltage is not measured, the momentary power consumption is determined by the momentary terminal current alone.

The momentary power consumption is integrated during a user activity $2a, \ldots, 2m$ power consumption measurement to obtain a user activity power consumption measure.

During or following the test of step 6 in the process described above, the user activity power consumptions are stored 7 in a data structure 8 by the processor 22.

A user activity power consumption measure is treated as the sum of its terminal power consumptions measures. After a set of user activity power consumption measures have been established, the processor 22 is arranged to calculate the terminal activity power consumption measure, by linearly combining the user activity power consumption measures, i.e. by solving a set of linear equations. The results can be stored by the processor in data structures representing the terminal activities power consumption measures.

The processor can be further equipped with a data structure representing a usage profile $3a \ldots 3l$. The usage profile $3a \ldots 3l$ comprises representations of user activities $2a \ldots 2m$ that are performed during a certain time. This time may be represented in time units, or by a percentage of a time related to the usage profile.

By combining the terminal activity power consumption measures the impact of several usage profiles on the overall power consumption measure of the terminal can be calculated. The power consumption measure can further be compared to the same usage profile of other terminals.

The present invention may alternatively be defined as method for the prediction of the power consumption of a mobile terminal, which method may comprise the steps of:
performing at least one user activity on the mobile terminal,
measuring the power consumption of the mobile terminal during the at least one user activity, wherein the at least one user activity comprises at least one terminal activity,
establishing a user activity power consumption measure by integrating the power consumption of the mobile terminal during the at least one user activity,
calculating at least one terminal activity power consumption measure from the at least one user activity power consumption measure,
calculating a user activity power consumption measure from the at least one terminal activity power consumption measure, and
calculating a terminal power consumption measure from the at least one user activity power consumption measure, using a usage profile comprising at least one user activity.

By measuring the terminal current drawn from the power source, the power consumption can be established. The power consumption is measured during a limited number of user activities according to a usage profile. From the measured power consumption during the actually performed user activities, that is the power consumption of the terminal activities, it is possible to calculate the power consumption of further user activities that have not actually been performed, but of which is previously established which terminal activities contribute to such further user activities. Thus the power consumption of various usage profiles having different user activities or having the same user activities, but in a different mix in time, may be calculated based upon the terminal activity power consumptions, whereby such usage profiles do not actually have to be performed.

It will be understood by those skilled in the art that many modifications and amendments are possible without departing from the scope of the invention as defined by the appended claims.

The invention claimed is:

1. A method of predicting the power consumption of a battery-powered mobile terminal used for carrying out a sequence of user activities, wherein each user activity involves an interaction with the terminal and wherein each user activity causes one or more terminal activities involving power consumption of the terminal, the method comprising the steps of:
determining, for each user activity, terminal activities caused by each user activity,
carrying out a series of user activities, the terminal activities caused by the series of user activities involving at least all terminal activities caused by the sequence of user activities,
measuring the power consumption of the terminal while carrying out the series of user activities,
deriving a power consumption of each terminal activity from measured power consumption of the terminal during the measuring step,
adding, for each of the user activities of the sequence of user activities, power consumption of respective terminal activities caused by each particular user activity to obtain the power consumption of the respective user activity, and
adding the respective power consumption of the user activities of the sequence of user activities to obtain the power consumption of the sequence of user activities.

2. The method according to claim 1, wherein the series of user activities is identical to the sequence of user activities.

3. The method according to claim 1, wherein the series of user activities is not identical to the sequence of user activities.

4. The method according to claim 1, wherein the series of user activities is defined by a test template.

5. The method according to claim 4, wherein the test template is constituted by a user profile.

6. The method according to claim 1, wherein the step of measuring power consumption of the terminal comprises measuring current consumption of the terminal.

7. The method according to claim 6, wherein the step of measuring power consumption of the terminal comprises measuring a power source voltage from a power source connected to the terminal.

8. A non-transitory computer-readable medium including computer-executable instructions for carrying out a method of predicting power consumption of a battery-powered mobile terminal used for carrying out a sequence of user activities, wherein each user activity involves an interaction with the terminal and wherein each user activity causes one or more terminal activities involving power consumption of the terminal, the method comprising the steps of:
determining, for each user activity, terminal activities caused by each user activity,
carrying out a series of user activities, the terminal activities caused by the series of user activities involving at least all terminal activities caused by the sequence of user activities, measuring power consumption of the terminal while carrying out the series of user activities, deriving a power consumption of each terminal activity from measured power consumption of the terminal during the measuring step, adding, for each of the user activities of the sequence of user activities, power consumption of respective terminal activities caused by each particular user activity to obtain the power consumption of the respective user activity, and adding the respective power consumption of the user activities of the sequence of user activities to obtain the power consumption of the sequence of user activities, and wherein the computer-executable instructions include at least instructions for performing the deriving and adding steps.

9. A system for predicting power consumption of a battery-powered mobile terminal used for carrying out a sequence of user activities, wherein each user activity involves an interaction with the terminal and wherein each user activity causes one or more terminal activities involving power consumption of the terminal, the system comprising:

a power source, terminal connection for connecting the power source to the terminal, the terminal connection comprising a current measuring device, a data acquisition interface connected to the current measuring device for inputting a terminal current measure, a terminal power consumption evaluation processor connected to the data acquisition interface, wherein the terminal power consumption evaluation processor is arranged for measuring power consumption of the mobile terminal during a series of user activities, the terminal activities caused by the series of user activities involving at least all terminal activities caused by the sequence of user activities, and wherein the processor is further arranged for performing the steps of:

deriving a power consumption of each terminal activity from measured power consumption of the terminal activity, adding, for each of the user activities of the sequence of user activities, power consumption of respective terminal activities caused by each particular user activity to obtain the power consumption of the respective user activity, and adding the respective power consumption of the user activities of the sequence of user activities to obtain the power consumption of the sequence of user activities.

10. The system according to claim 9, wherein the data acquisition interface is provided with an input interface for inputting a power source voltage, and wherein the processor is further arranged for measuring the power consumption of the mobile terminal by measuring the power source voltage from a power source connected to the terminal.

11. The system according to claim 9, further comprising a display, wherein the processor is arranged for displaying the terminal power consumption measure on the display.

12. The system according to claim 10, further comprising a display, wherein the processor is arranged for displaying the terminal power consumption measure on the display.

* * * * *